United States Patent

[11] 3,623,101

[72] Inventors Robert Karl Grebe;
 Earl Raymond Kreinberg, both of
 Harrisburg, Pa.
[21] Appl. No. 744,070
[22] Filed July 11, 1968
[45] Patented Nov. 23, 1971
[73] Assignee AMP Incorporated
 Harrisburg, Pa.

[54] RF POSITION-SENSING AND CONTROL SYSTEM
 10 Claims, 13 Drawing Figs.
[52] U.S. Cl. .................................................. 343/112 R,
 318/16, 340/258 C, 343/112 D
[51] Int. Cl. ............................................................... G01s 11/00
[50] Field of Search ............................................. 343/112, 5
 PD; 340/258 C, 259; 318/16

[56] References Cited
 UNITED STATES PATENTS
2,877,397 3/1959 Poschner et al. ............. 318/6
3,218,530 11/1965 Momberg et al. ............. 318/16
3,226,702 12/1965 Zawels ........................ 340/259
3,237,105 2/1966 Kalmus ........................ 340/258 C UX
3,345,812 10/1967 Pickering .................... 340/259 X

*Primary Examiner*—Rodney D. Bennett, Jr.
*Assistant Examiner*—Richard E. Berger
*Attorneys*—Curtis, Morris and Safford, Marshall M. Holcombe, William Hintze, William J. Keating, Frederick W. Raring, John R. Hopkins, Adrian J. La Rue and Jay L. Seitchik ABSTRACT: Method and means are disclosed for sensing and detecting the position of a member by the effect of the member on the coupling between sensing elements separately connected to an RF transmitter and an RF receiver. The sensing elements are disposed to provide a degree of coupling therebetween related to the physical position of the member between such elements and to produce a sensed signal indication of either member position or member presence. The sensed signal is detected and applied to a utility device which may be in the form of an alarm, counter indicator, recorder, or in the form of a motor to provide a feedback signal capable of altering the position of the sensed member. In one form of the invention a wire or strip feeding control apparatus senses the position of a free-hanging span of the wire or strip to develop a reel-motor control signal and adjust the fall or sag of the span, thereby controlling feed rate and wire or strip tension. For nonconductive sensed members or for fluids a conductive element is carried in a frame of dielectric material in the plane of the sensing element coupling which restricts the sensed member to movement along an axis bisecting the zone of coupling of the transmitting and receiving antenna elements.

INVENTOR
ROBERT KARL GREBE
EARL RAYMOND KREINBERG
By John R. Hopkins

INVENTOR
ROBERT KARL GREBE
EARL RAYMOND KREINBERG

BY John R Hopkins

RF POSITION-SENSING AND CONTROL SYSTEM

BACKGROUND OF THE INVENTION

A number of control systems have been developed for controlling the physical position of a traveling member such as a wire, strip or thread in a free-hanging span between work stations or the like. Perhaps the most common system is one where the position of a suspended and traveling member is utilized directly to close contacts which in turn start or stop a motor-driven takeup reel. For nonconductive members contact closure may be effected indirectly. One problem with systems of this type is that certain kinds of members, such as a strip of stamped and formed terminals, may have a surface configuration which does not lend itself to being engaged by another element, to either close contact directly with such element or drive such elements to close contact for control purposes. With certain other kinds of members the condition of the member when fed may require that the member not be touched between support rollers by any sensing elements. For example, the member being fed may have a coating or covering thereon which is in the process of drying between feed rollers; or the member being fed may be at relatively high temperature, in the process of cooling between feed rollers.

Another feed control system which is sometimes employed utilized an optical technique wherein the position of the member being fed is made to cast a shadow sensed by a photoelectric cell. Experience with optical systems has revealed that in a factory environment dust particles or other substances may build up on either the light source or the light-receiving element to cause a gradual deterioration in sensitivity and result in a slight, but steady, loss of feed control.

Still another system employed in the press art is based upon a variation in capacitance between an electrode which is part of a capacitor and the member being fed, with receive control voltage signal being developed by reason of a variation in capacitance. U.S. Pat. No. 2,877,397, to H. Poschner et al. is one example of a capacitive system. Other systems which use inductive detuning effects of an oscillator circuit for developing position control signal. U.S. Pat. No. 2,116,586 to H. M. Stollers, is directed to a variable inductance type of feed control technique. U.S. Pat. No. 2,661,009 to T. Dunnigan et al. describes a feed control system based on the use of a saturable reactor proximity sensing element.

In general, control systems of the prior art require a rather precise and closely spaced positioning of the sensing elements and generally lack sensitivity to changes in position of the sensed member. Prior art system do not readily accommodate variations in configuration or in materials of the member sensed by the system and do not facilitate use with feed techniques of different span requirements. Precise and close spacing of sensing elements is generally undesirable, being affected by the presence of moisture, corrosive gases, dust and other contaminants likely to be found in a factory environment.

SUMMARY OF THE INVENTION

The present invention relates to the method and means for sensing the position or presence of a moving member and, in one embodiment, for also generating a control signal representing the position of such member which signal may be used to control the position of the member through a drive motor or the like or to provide a count of members.

It is an object of the invention to provide position-sensing method and means which is relatively independent of the surface configuration, span or material characteristics of a sensed member. It is a further object to provide a method and means for sensing the position of a member which is relatively unaffected by the environment of use and particularly by an environment expected to have moisture, dust, or other airborne contaminants. It is yet a further object of the invention to provide a method and means for controlling the position of a travelling member in a manner which is simple and inexpensive but yet more reliable than techniques based on physical contact or optical techniques. It is another object of the invention to provide an apparatus for sensing the position of a member which features a member positioned sensing structure which requires neither precise nor close spacing relative to its use.

The foregoing are attained by the present invention by sensing and detecting the effect of a member on the field coupling between sensing elements separately connected to an RF transmitter and an RF receiver. The sensing elements in one embodiment are disposed at an angle relative to each other to provide a coupling which increases from one end of the elements to the other with such coupling intersected by the line of travel of the sensed member. The coupled field between sensing elements is modified by the position of the member within the zone of coupling between such elements. The signal detected by the receiver is proportional to the degree of coupling between antenna elements to provided an indication of member position. The detected signal is in one embodiment made to drive a utility device which may be considered as an alarm, counter indicator, a measuring instrument, a recorder or the like. In another embodiment the detected signal is connected to control a motor which in turn controls a reel driving the member to a preferred disposition within the sensing elements coupling. In one embodiment an open-ended sensing system is employed with the sensed signal offset against a voltage to define a threshold for motor operation. In a further embodiment pairs of sensing elements are employed to define a closed system providing sensing zone of minimum coupling surrounding the member disposed therebetween. In yet another embodiment a mechanical structure is provided in the form of a slidable conductive element to enhance the use of the invention method and means with very fine nonconductive members, such as thread filaments, or with fluids.

In the drawings:

FIG. 7 is a perspective view illustrating a use of the system of FIG. 6 to take up the output of a stamping press or the like;

FIG. 10 is a perspective view of the system depicted in FIG. 9 as applied to takeup the output of the stamping press or the like;

FIG. 11 is a perspective view of an embodiment of the sensing elements of the invention for use with very fine nonconductive members, such as thread, filaments or the like.

DESCRIPTION OF PREFERRED EMBODIMENT

Figure 1A:
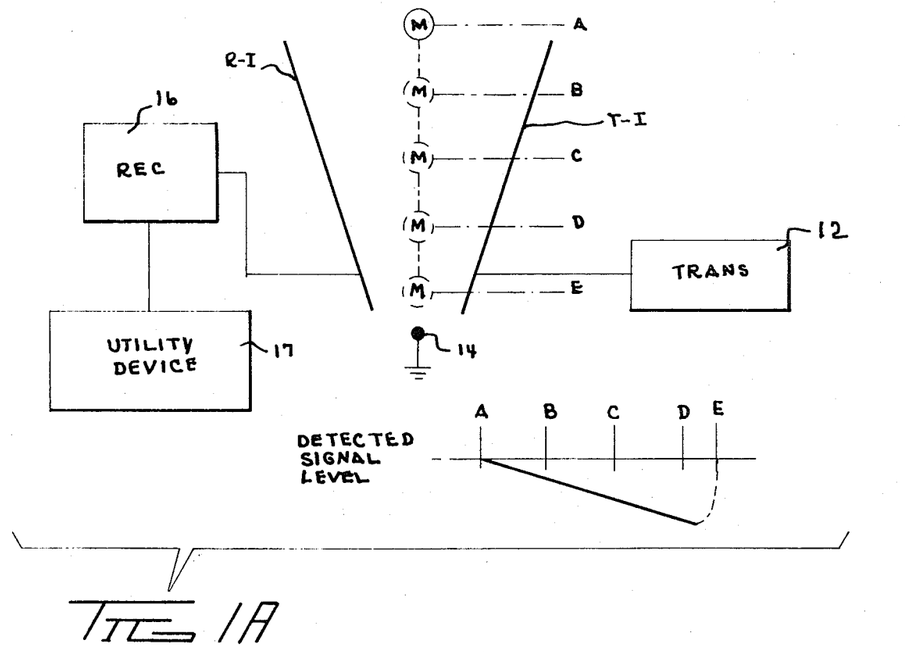
FIGS. 1A and 1B are schematic views of the invention method and system as generally applied to sensing and detecting the position of a member, and in counting respectively.

Turning now to FIG. 1A, a generalized showing of a position-sensing circuit is laid out relative to a member M which may be expected to move in the manner indicated within a zone of coupling between sensing elements T–I and R–I. The sensing T–I may be considered as being field coupled to element R–I. Member M may be considered as any object for which an indication of position is sought. The showing in FIG. 1A may be considered as a plan view with M being considered as an animate body, vehicle or a part on a conveyor belt or the like moving along the path indicated by the dotted line. Alternatively, FIG. 1A may be considered as depicting a section of a span with M being considered as a strip, wire, thread, or the like suspended in a plane extending transversely of the plane of the drawing.

In accordance with the invention concept, T–I is supplied by a signal course in the form of a transmitter 12 connected thereto by a coaxial lead. The coaxial lead is suitably grounded in a manner to be described and such grounding and generally the ground plane of the system is represented by the numeral 14 in FIG. 1A. Element R–I is connected by a coaxial lead to receiver 16 with the shielding path of the connecting coaxial lead being similarly grounded as at 14. Energy transfer between T–I to R–I may be considered to be affected by the member M. If M is considered as defining a path to ground having an impedance less than air, such affect will be considerable. The coupling between T–I and R–I may also be affected by the wavelength of the signal coupled between T–I and R–I and by the material characteristics of M. For a given application, the wavelength of the generated signal may be selected to insure a sufficient affect upon coupling by the member M to be detected.

The signal coupled to R–I is detected and supplied as an input to a utility device shown as 17 in FIG. 1A. The utility device may be an alarm, indicator, measuring instrument, recorder to the like. The waveform depicted beneath the schematic of FIG. 1A represents a detected voltage level corresponding to the different positions of member M within the coupling of the sensing elements of T–I and R–I. The dotted-in portion of FIG. 1A represents what the signal waveform would be if M were displaced to the position labeled "E".

Figure 1B:
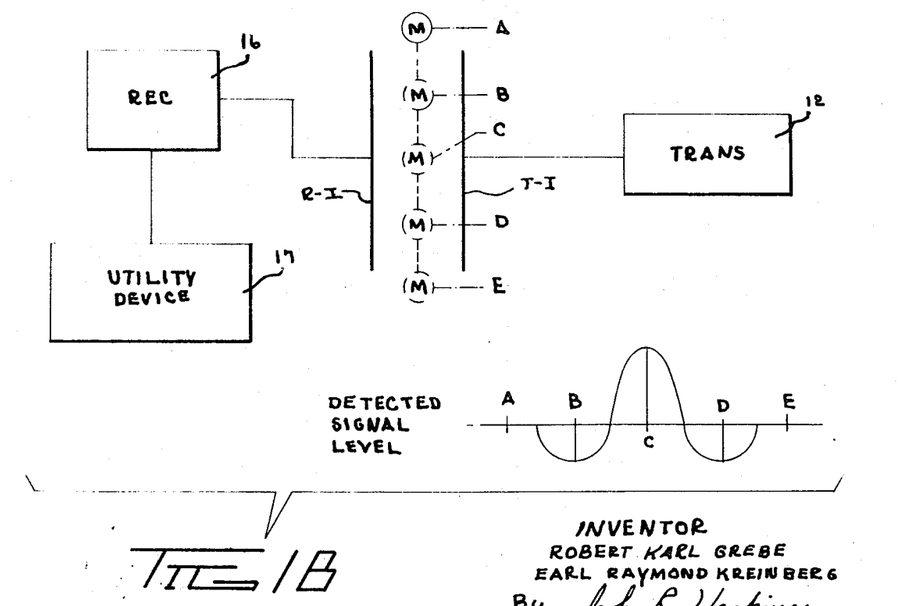

FIG. 1B shows an identical circuit schematic with T–I and R–I substantially parallel together with an illustration of the resulting detected signal waveform for movement of M into, through and out of the coupling between elements T–I and R–I. A comparison of the waveform of FIG. 1A and FIG. 1B will show the effect of angular disposition of the sensing elements T–I and R–I upon linearity and sensitivity of the system. The circuit and sensing element orientations of FIG. 1B is preferred for counting applications where member M passes through the sensing elements, the relatively large waveform excursion providing a pulse-type signal relatively easy to detect for operating a variety of digital counters, either electronic or electromechanical.

Figure 2:
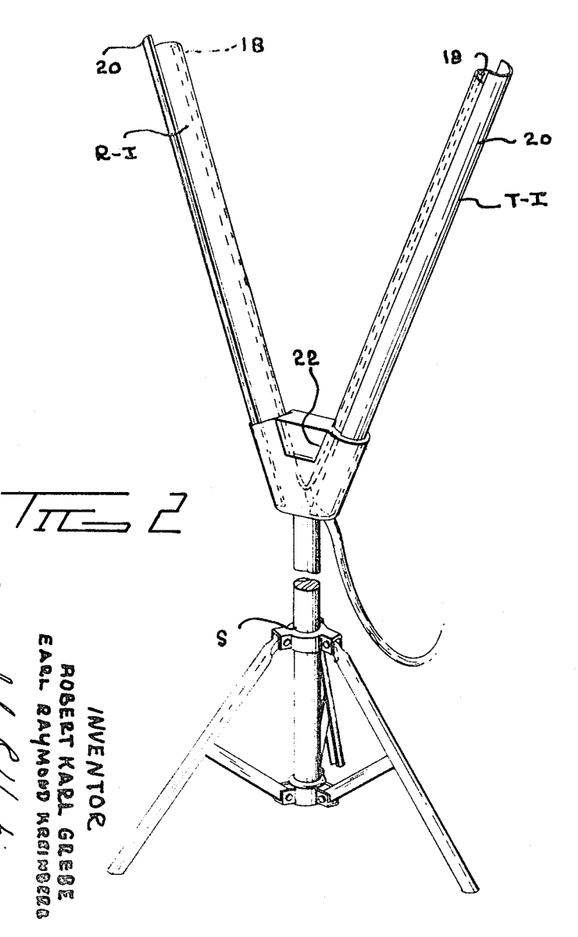
FIG. 2 is a perspective view of a sensing structure in an embodiment adapted for use with the system of FIG. 1A.

FIG. 2 shows one embodiment of a portable sensing structure mounted on a stand S for use in FIG. 1A application. The sensing elements T–I and R–I are comprised of wires enclosed within plastic tubes 18 having a shielding in the form of a metal foil 20 around part of the outside of the tubes. Wires forming the sensing elements are positioned within the tubes 18 and are terminated at the lower ends through a coaxial cable which leads to the transmitter and receiver elements 12 and 16 in the manner shown in FIG. 1A. The coaxial portion of the cables connecting elements T–I and R–I to the transmitter and receiver elements is connected to the shielding 20 on the tubes. This shielding is made to extend all along the tube and generally beneath the lower end of the wires forming the sensing elements to isolate the elements from stray radiation. The tubes and the sensing elements are physically held by an insulating structure shown as 22 which includes an upper surface extended above the lower ends of the wires forming the antenna elements to prevent a member M from moving down below the lower ends of the antenna elements; i.e. to the position "E" depicted in FIG. 1A. Experience with an embodiment like that depicted in FIG. 2 has revealed that when the member M approaches too closely to the lower ends of the sensing elements there is a slight increase in coupling believed to be due to some proximity effect. This phenomena does not, however, serve to practically limit the application of the invention, since there is a wide area of possible movement of M within the V-shape of the sensing elements. As can be discerned from FIG. 2, the technique of the invention provides a sensing structure which is relatively open to accommodate sensing of members of different spans and different configurations. In an actual embodiment, the structure shown in FIG. 2 was comprised of plastic tubes approximately three-quarters of an inch in ID and 18 inches long, with an aluminum foil extended fully along the length of the tubes and around the outside surface for slightly more than 180°. The sensing elements were formed of No. 18 AWG copper wire, 16 inches long, extended from the top of the tubes down to approximately 2 inches from the bottom of the tubes. The upper surface of the insulating member 22 was made to be approximately 1 inch above the lower ends of the sensing elements. The sensing elements were positioned at an angle of approximately 65°.

Figure 3:
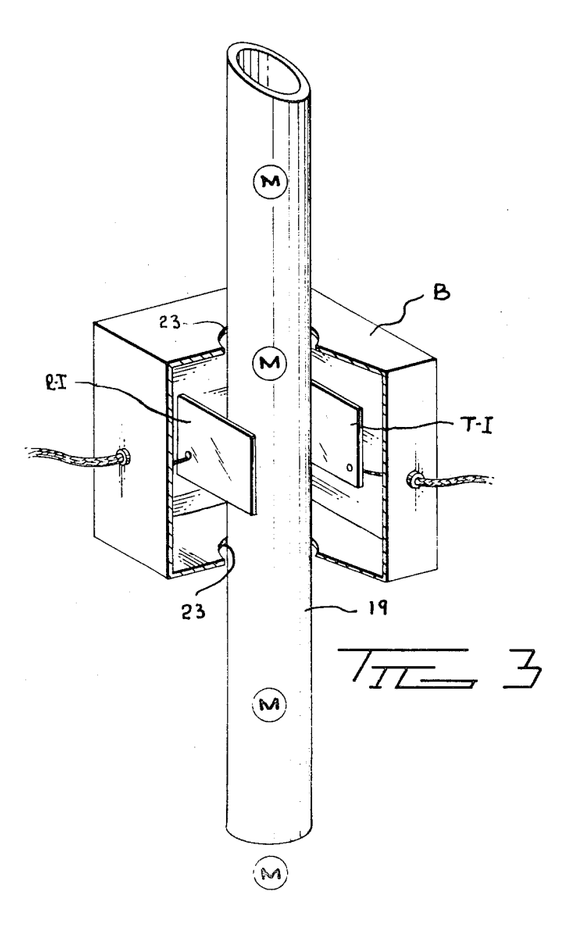
FIG. 3 is a perspective view of a sensing structure in an embodiment adapted for use with the system of FIG. 1B.

FIG. 3 shows a portable sensing structure for use in FIG. 1B application. The sensing elements T–I and R–I are comprised of plates mounted in a metal box B by a suitable plastic frame, not shown, isolating the plates from each other and from the box. The box includes apertures 23 in the top and bottom through which is fitted a plastic tube 19 adapted to feed members M to be counted by the system. The signal lead of coaxial cables are connected to the plates T–I and R–I with the shield of such cables connected to the box. In an actual embodiment the plates serving as T–I and R–I were unetched standard printed circuit boards about 1 inch by 1 inch, spaced apart about 1 inch and held parallel. Conductive and nonconductive members as small as one-fourth inch in diameter could be counted accurately when no more than one-fourth inch apart and when dropped through the tube 19.

Figure 4:
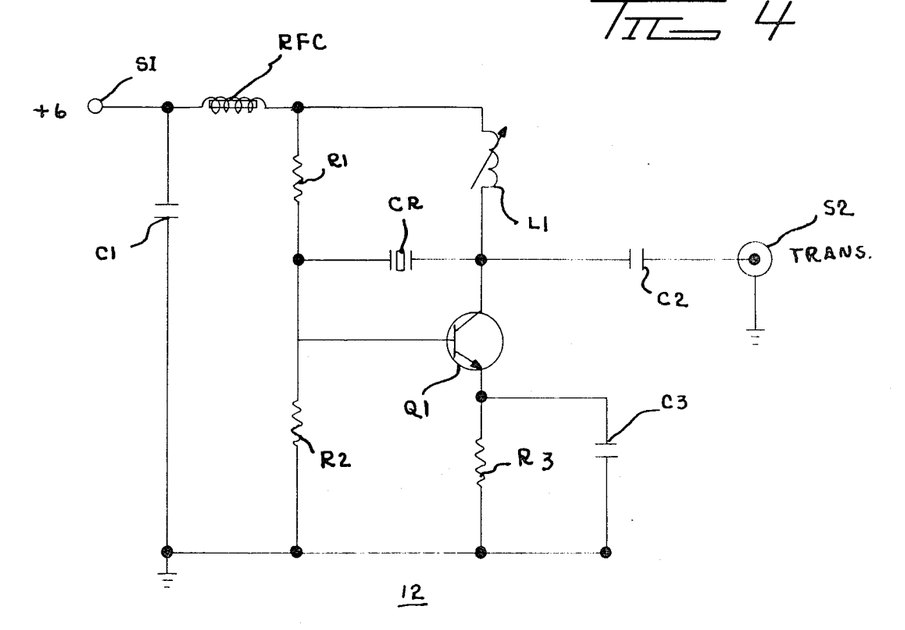
FIG. 4 is a schematic circuit diagram for an embodiment of a signal source of transmitter for use with the invention system.

Referring now to FIG. 4. an embodiment of a transmitter is shown for use with systems depicted in FIGS. 1A and 1B. The circuit shown as 12 includes a supply as S1 and an output through a coaxial connection shown at S2, which represents a short length of coaxial cable connected to the sensing element T–I. Connected between the supply S1 and ground is an RF bypass capacitor C1 which serves to keep RF developed in the circuit out of the supply. An RF choke, RFC, is included between the supply and the oscillator portion of the circuit to also limit feedback of RF into the supply. Connected across the supply lead and ground are a pair of resistors R1 and R2 which serve as a divider network to supply a base bias for an NPN-transistor Q1. The emitter of Q1 is connected through an emitter bias resistor R3 to the ground side of the circuit and an emitter bypass capacitor C3 is connected in parallel with R3. The collector of Q1 is connected in common to a crystal CR and a slug tuned coil shown as L1. A coupling capacitor C2 is connected between the collector Q1 and the transmitter output lead S2. In operation, L1 and C2, along with a portion of the coaxial lead to element T–I through S2 and the output capacitance of Q1 form a parallel resonant circuit. The crystal CR operates to provide a feedback at its resonant frequency to control conduction of Q1, and result in an oscillatory output at an RF frequency equal to the resonating frequency of the crystal. The circuit of FIG. 4 is designed to be a signal source which is relatively insensitive to load and capable of providing good stability with respect to the generated signal and the temperature of the environment of use. In an actual embodiment the transmitting circuit 12 included the following components:

| Supply | +6 volts |
| C1 | 0.1 mf. mf. |
| C2 | 0.01 mf. |
| C3 | 0.01 mf. |
| R1 | 100K ohms |
| R2 | 10K ohms |
| R3 | 1K ohms |
| L1 | 200 ohms |
| RFC | 2.4 mh. |
| CR | 1.6 mc. AT |
| Q1 | ZN2270 |

The transmitter 12 produced a 1.6 megacycle signal at approximately 35 milliwatts.

Figure 5:
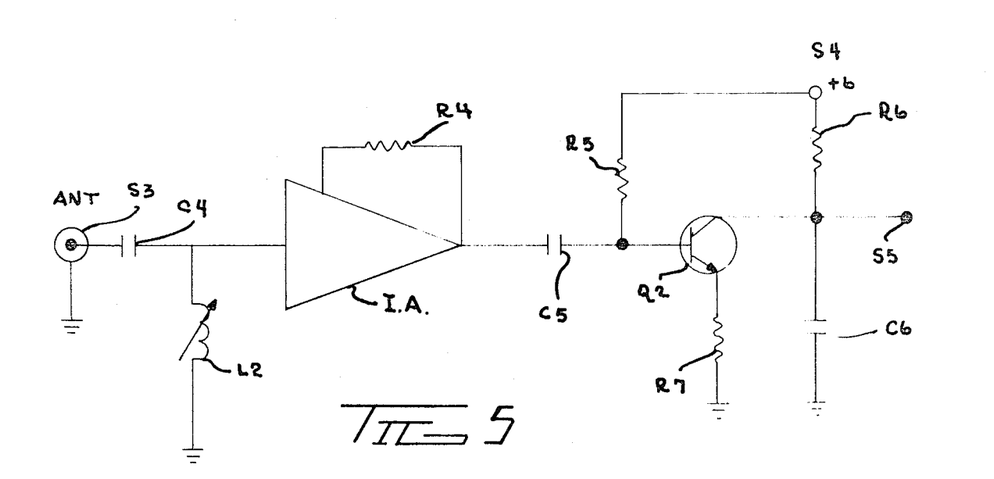
FIG. 5 is a schematic diagram of a receiver circuit useful with the invention.

FIG. 5 shows a receiver for use in accordance with the invention. Element R–I is connected through a coaxial lead terminal S3 to a decoupling capacitor C4. A slug-tuned inductor L2 is connected to the input lead and ground to provide in conjunction with the coaxial cable capacitance, the capacitor C4 and the input capacitance of an amplifier IA, a parallel resonant circuit. The amplifier IA is a standard integrated circuit, video, wideband amplifier. Resistor R4 provides gain control for IA and the output from IA is connected through a coupling capacitor C5 to a detector stage including an NPN-transistor Q2. The base-collector circuit of Q2 is tied together through a bypass resistor R5 across a load resistor R6 to a voltage supply terminal S4. Output from the receiver is provided at a terminal S5. The emitter of Q2 is connected to a bias resistor R7, in turn connected to ground. A filter capacitor C6 is connected to the output lead to carry unwanted AC signal components to ground. In operation a sensing signal of a relatively low level such as a 1 microvolt is amplified by IA to a level of approximately 1 volt supplied to the base of Q2. As the input signal swings positive, Q2 is biased to conduct and as the input signal swings negative, Q2 cuts off to provide a rectified signal output as a control signal of approximately 5 volts maximum amplitude. The detector shown in FIG. 5 is a high gain amplifier biased for class C operation. The detector of the circuit shown in FIG. 5 effectively inverts the input signal so that when the sensed signal level is at a relatively low value there is a DC output voltage which is at a maximum. When the sensed signal is increasing and at a relatively large value, a DC output is produced which is at a relatively reduced level. The receiver of the circuit of FIG. 5 thus automatically provides an offset or threshold voltage for defining the operating point of a utility device, motor or the like.

In a use with the system of FIG. 1B the output from the output terminal S5 may be connected directly or through suitable amplifier to standard counter devices.

It will be recalled that in the case of the system shown in FIG. 1B, the two sensing elements T–I and R–I are positioned parallel to one another, with the member M moving along a path into, through, and then out of the coupling field. The pulse-type waveform seen in FIG. 1B is produced by means of the following circuit operation.

It is first noted that the horizontal line superimposed on the waveform in FIG. 1B represents not a zero signal level but a positive voltage level. This level was made to be about 2.0 volts DC in an embodiment actually constructed. The sensing elements T–I and R–I in this configuration have a coupling comparable to that of a parallel-plate capacitor, with the part M removed from the coupling field as it is at positions A and E. Thus the signal levels at A and E on the pulse waveform represent the amount of detected energy with nothing between the parallel plates of the antenna elements T–I and R–I, i.e., a static level.

The waveform shown in FIG. 1B is generated due to the member M falling through the parallel-plate capacitor effectively formed by the parallel sensing elements T–I and R–I and its acting to change the coupling between the transmitter and receiver around the resonant point. At A, as was previously stated, the system is tuned slightly to one side of resonance (the input tank of the receiver being tuned by L2, C4, and the antenna capacity as shown in FIG. 5) so that the output level is about 2.0 volts DC with the member M at point A. By the time it has moved to point B, the member M has obviously entered the antenna system and will have added sufficient capacity to the antenna system to almost resonate the latter. This action causes a reduction in the detected DC output as shown at B in the waveform of FIG. 1B, since the receiver circuit 16 inverts the sensed signal in the same manner as indicated above. THe detected voltage is driven down to about 0.5 volts DC at B. Then, at C, the additional coupling capacity of the member M when positioned in the center of the antenna system has detuned the receiver input far on the other side of resonance and therefore the high DC output level shown at point C on the waveform is produced in stage Q2. At points D and E, the same conditions are true as at B and A as was explained immediately above.

In an actual embodiment the receiver of the circuit of FIG. 5 included the following components:

| | |
|---|---|
| C4 | 0.01 mf. |
| C5 | 0.01 mf. |
| C6 | 0.1 mf. |
| L2 | 200 ohms |
| R4 | 47K ohms |
| R5 | 8.2K ohms |
| R6 | 6.8K ohms |
| R7 | 82 ohms |
| IA | RCA CA3022 IC Amplifier |
| Q2 | 2N3392 |

The description heretofore given of transmitter and receiver circuits is intended to be illustrative and not limiting to the invention system. Many other types of signal sources and receiver circuits are contemplated for use with the invention, including circuits operating at different frequencies and at different power levels.

Figure 6:
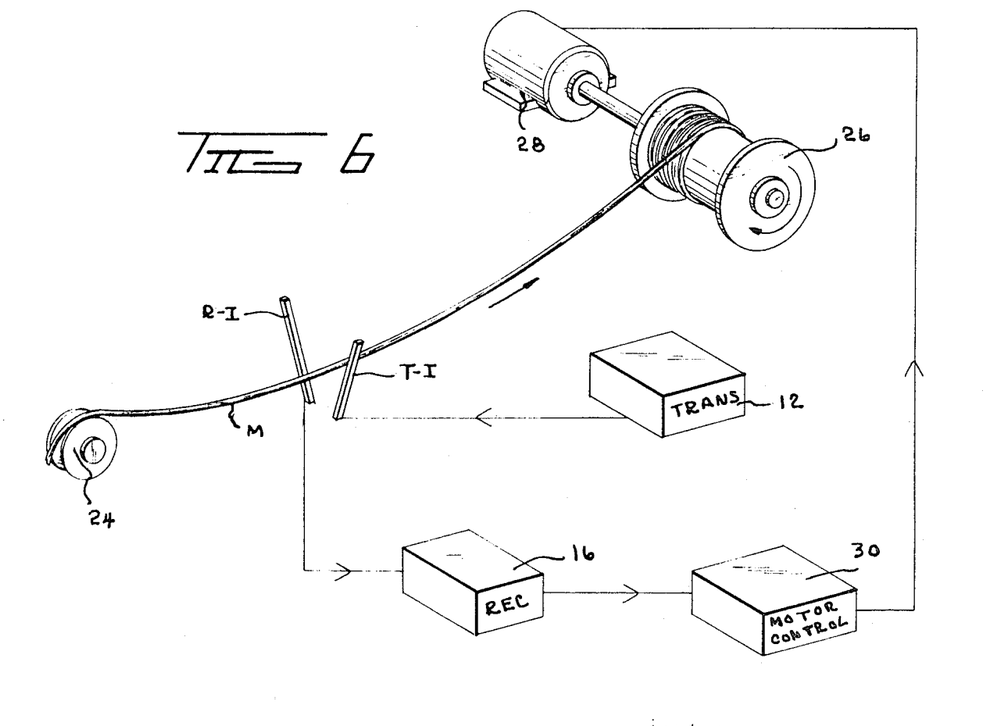
FIG. 6 is a schematic and perspective view of the invention system utilized to control a takeup reel to in turn control the position of a traveling strip.

Turning now to FIG. 6, the invention system heretofore described is shown as applied to a reeling application. The elements T–I, R–1, 12 and 16, as well as the sensed member M, are identical to those similarly numbered elements heretofore described. The member M is in the form of a strip being fed from some supply or processing source, not shown, over a roller 24 through a span as shown onto a takeup reel 26, driven by a motor 28. The motor 28 is, in turn, driven by a signal developed from a motor control unit 30. The motor control unit 30 is driven by the output of receiver 16. Motor 28 may be considered as a standard DC motor capable of responding to rotate at a speed related to the level of a DC input signal. It may be assumed that motor 28 has some threshold due to friction and the load driven thereby, below which the motor and the driven part are effectively stopped.

In operation, assuming that strip M is being supplied over roller 24 to an extent that the span tends to fall or sag, so that M drops between T–1 and R–1, the coupling therebetween is effectively decreased so that the signal level input to receiver 16 is effectively reduced. In accordance with the receiver circuit operation described with respect to FIG. 5, the output from the receiver will thus increase to cause an increase in output from the control unit 30 to motor 28, tending to drive 28 to rotate the reel 26 taking up the slack in the span of M. The level of output from 16 will be proportionate to the position of M within the antenna elements so as to drive the motor faster, as M approaches the bottom of the antenna element. Assuming that the rotation of the reel 26 causes M to now rise within the sensing elements, increasing the effective coupling therebetween, receiver 16 will detect a greater signal input but through inversion produce a reduced signal output to the motor control unit 30, which in turn, will decrease the input to motor 28 and the reel speed of 26. As an additional point, it is to be observed that as M moves upwardly relative to T–1 and R–1, the sensitivity of the sensing system is decreased. In actual practice a system like that shown in FIG. 6 has been found to experience little, if any, tendency to hunt and this advantageous result is believed to be due in part to the inherent lessening of sensitivity as the sensed member moved into a desired position within the zone of coupling of the sensing system. It is, of course, contemplated that the position of the member M within the coupling of the sensing elements may be selected so that it is near the top of the coupling, toward the middle or even toward the bottom if such is desired. This control may be accomplished in a number of different ways, including an adjustment of gain in the receiver or by a separate auxiliary offset voltage supply.

Figure 7:
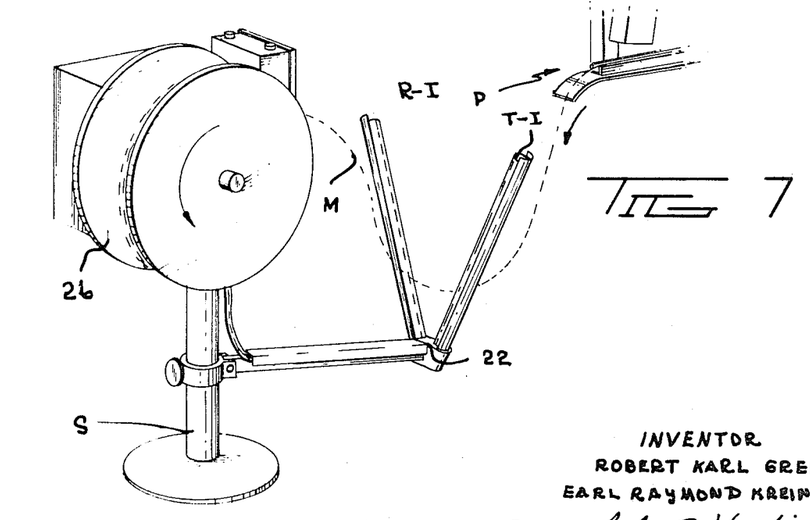
Figures 8, 9:
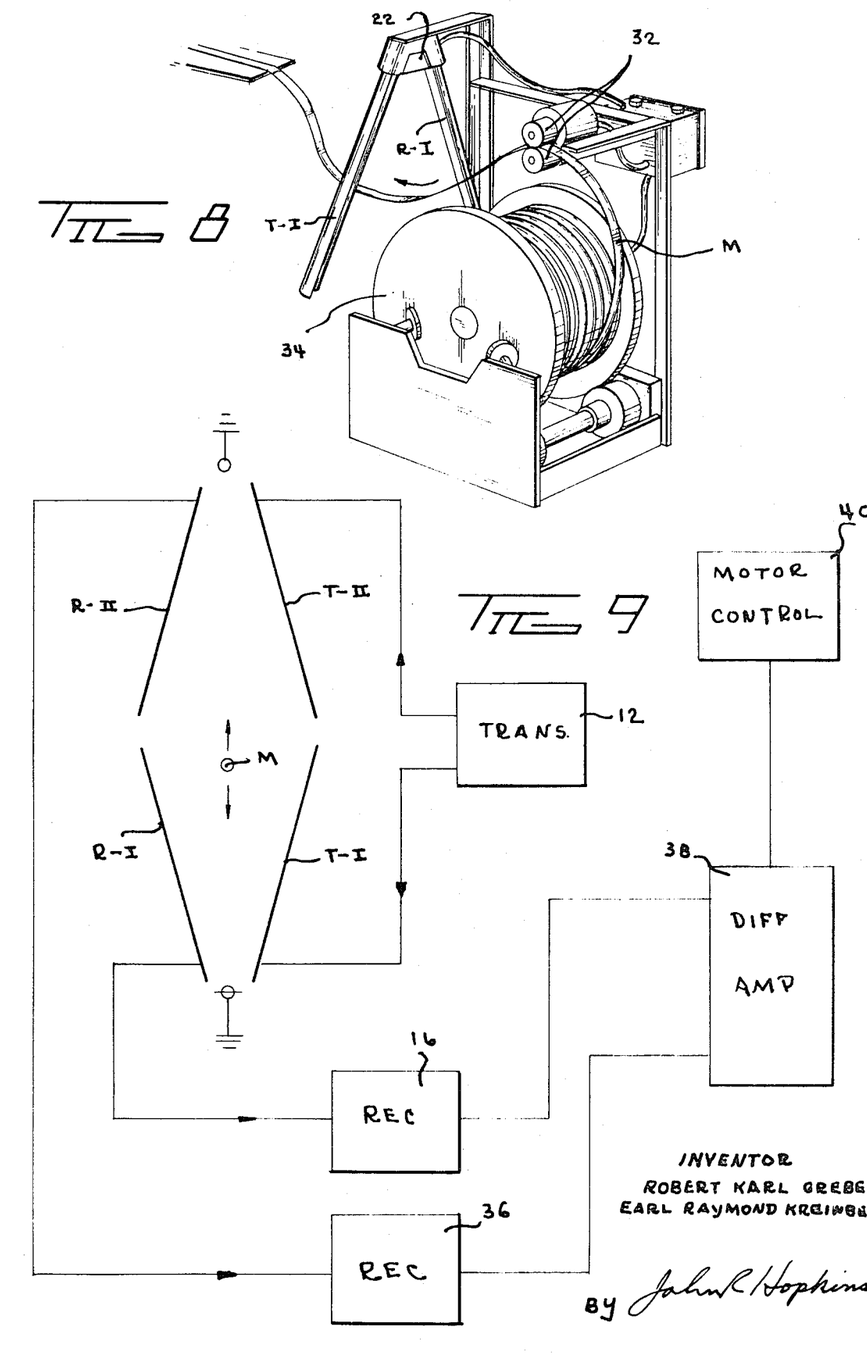
FIG. 8 is an alternative view of the system of FIG. 6 for unreeling a strip.
FIG. 9 is a schematic view of an alternative embodiment of the invention system utilizing pairs of sensing elements to define a member sensing coupling which is closed around the member being sensed.

FIGS. 7 and 8 show schematically two practical setups for controlling the feed rate and tension in a member M. FIG. 7 depicts the invention system utilized with a takeup reel for a strip output from a stamping press P, or the like. The press P may be considered to include means for advancing the member M in strip form to form a loop or span, as shown, received by takeup reel 26, mounted on a stand S. The configuration of the span and thus the feed rate and tension on the strip may be controlled in the manner described with respect to FIG. 6. FIG. 8 shows a use of the invention embodiment for unreeling a reel of strip material. The structure of FIG. 8 includes a pair of driving rollers 32 driven by a motor, not shown, to pull M from a reel 34 supported for free rotation and feed M to a work station situated to the left of FIG. 8. Elements T–I and R–I are mounted in a supporting structure 22 and are positioned in a sense which is the reverse of the sense shown in pervious FIGS. relative to the sag or fall of the span of M. The structure of FIG. 8 otherwise works in a manner identical to that heretofore described. Considering that the strip M tends to fall, the coupling between T–I and R–I will be increased to provide an increased output to the receiver associated with the system of FIG. 8, which through inversion will reduce the drive to the motor-driving roller 32 until means accepting strip M takes up the slack, causing M to rise within the sensing elements. As M rises within the sensing elements, coupling therebetween will be reduced to result in an increase input to the motor-driving rollers 32, drawing M off of the reel 34 at a higher rate. It is to be noted that in the embodiments shown in FIGS. 8 sensitivity of the system tends to increase as the span from M rises.

Figures 10, 11:
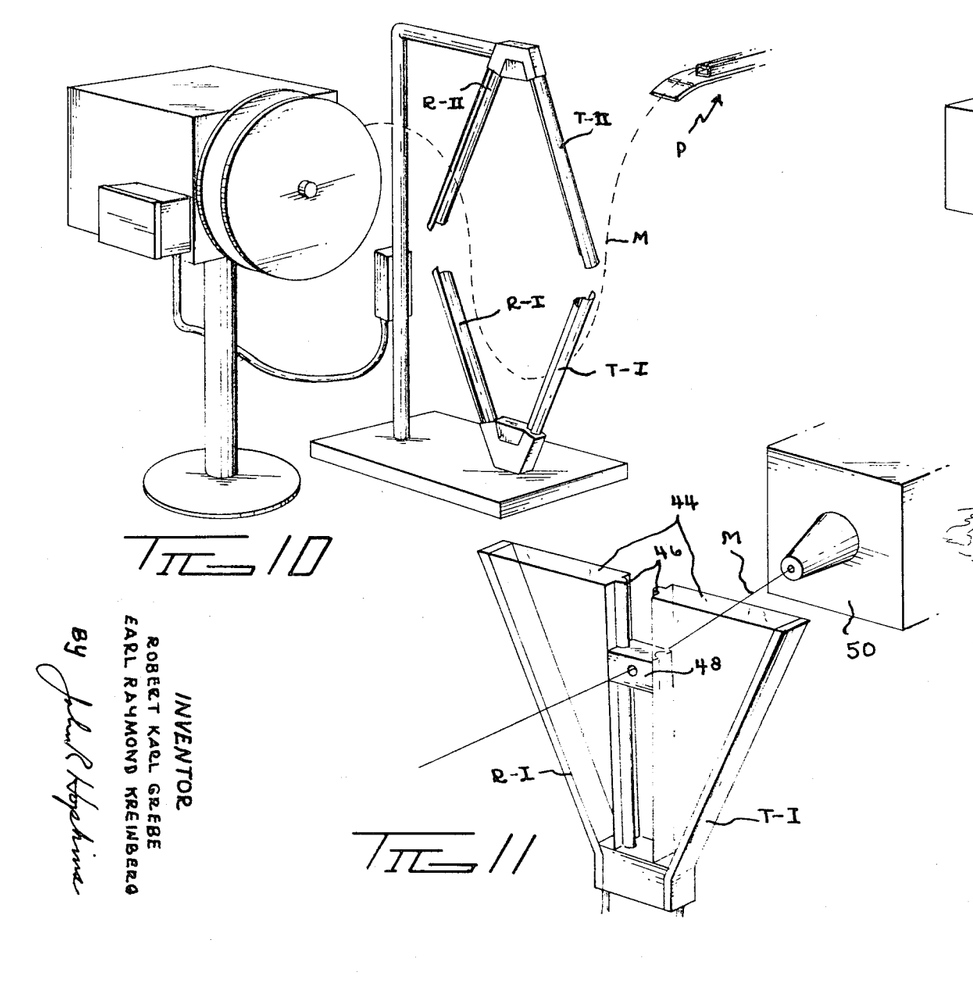

Referring now to an alternatve embodiment for a closed antenna system, FIGS. 9 and 10 show a sensing element system including elements T–I and R–II in addition to the elements T–I and R–I. Element T–II is driven by transmitter 12 through a separate coaxial lead in the same manner as element T–I. The circuit shown in FIG. 9 includes, in addition to receiver 16, heretofore described, an identical and parallel receiver shown as 36 connected to the second sensing element R–II. The outputs of receivers 16 and 36 are connected to an amplifier 38 which has an output connected to a motor control unit 40. In operation, the system of the circuit shown in FIGS. 9 and 10 works in a manner similar to that heretofore described. As M tends to rise out of the zone of coupling between T–I and R–I, it tends to enter the zone of coupling of T–II and R–II, and in so doing it decreases the coupling therebetween to effectively decreases the signal input to receiver 36 and result through the inversion heretofore mentioned in an increase in signal from receiver 36 to amplifiers 38.

The amplifier 38 may be considered as a difference amplifier to provide an output signal to control unit 40 and thus to the motor-driving M which is proportionate in level and polarity to the algebraic sum of input signals of different polarity. In such event, 16 may be considered as producing a positive input to 38 and 36 may be considered as providing a negative input to 38; both inputs being of a level proportionate to the degree of coupling between the pairs of sensing elements T–I, R–I, and T–II, R–II, respectively. An input of some positive level from 16 with a zero or minimum input from 36 will result in a positive level output from 38 to 40, which can be utilized to drive a DC motor in one direction to drive a reel causing M to rise within the sensing system. An input of some positive level from 36 with a minimum or zero level input from 16 will result in a negative level signal output from 38 to 40 and to the motor driven thereby. By using a bidirectional motor the driven reel may be made to effectively rotate in a sense to either draw M upwardly as well as effectively drive M downwardly, independently of the rate of supply of M from some other source. This will result in a more positive control of the strip span or tension in the member M. Amplifiers capable of difference operation are well known in the art.

It is also contemplated that the amplifier unit 38 may be a differential amplifier connected up to respond to inputs which are always of the same polarity. In this event receivers 16 and 36 would provide inputs to 38 which are always positive or always negative. The unit 38 would respond thereto to provide an output signal of varying polarity dependent upon the relative levels of input signals from 16 and 36. In operation, assuming that member M is at a given moment positioned downwardly within T–I and R–I, to provide a signal of reduced level to 16 with a full and complete coupling between T–II and R–II to provide a maximum signal level to 36, amplifier 38 would provide an output of a polarity based upon the output of 36. This would result in a maximum output of one polarity to motor control unit 40, driving the motor to cause M to rise. As member M enters into the coupling of T–II, R–II and leaves the coupling of T–I, R–I, the signal to 16 will increase and the signal to 36 will decrease accordingly. If M rises appreciably between T–II and R–II, the polarity of outputs from 38 to 40 will reverse, thus reversing the motor drive and causing M to fall. The sensing element structure shown in FIGS. 9 and 10 thus defines a central zone of loose coupling and lessened sensitivity which tends to hold M toward the center of the pairs of sensing elements.

Referring now to FIG. 11, an auxiliary mechanism is shown which is intended to increase the effectiveness of the sensing element system in positioning very fine traveling members and particularly nonconductive members. The sensing elements T–I and R–I are disposed as previously described with the traveling member M intersecting the coupling therebetween. The elements T–I and R–I are in the embodiment of FIG. 11, secured to plates 44 of insulating and dielectric material such as Lucite. The interior edges of the plate 44 are grooved as at 46 to define a path of movement for an element 48 slidably disposed between the plates. The element 48 is preferably of a lightweight plastic having a metallized surface. As the member M is tightened or slackened by the drive shown as 50, in FIG. 10, element 48 will follow the movement of M upwardly or downwardly within the coupling of the sensing elements to produce a variation in coupling developing a drive control signal through a circuit, not shown, but essentially like that described with respect to FIG. 6. An auxiliary sensing structure like that shown in FIG. 11 is contemplated for use with members having a surface configuration amenable to sliding engagement through a member like 48 and particularly for very fine nonconductive members, such as thread filaments.

Figure 12:
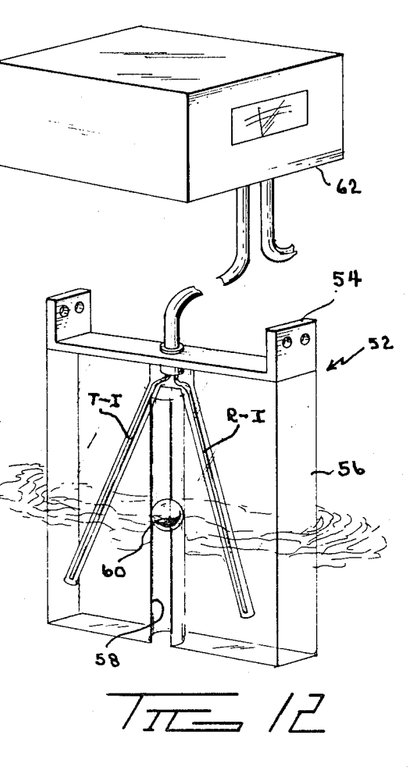
FIG. 12 is a perspective view illustrating a use of the invention for measuring fluid levels.

FIG. 12 shows an auxiliary sensing structure adapted for use in measuring liquid levels, The structure of FIG. 12 includes a frame 52 including at the top mounting brackets shown as 54 and a lower extending block portion 56 which is of plastic and dielectric material. Toward the center of the block portion is a rounded slot shown as 58 within which a metallized ball or other such element shown as 60 is captivated for sliding movement upwardly and downwardly relative to block 56. Holes accommodating elements T–I and R–I are provided on either side of the slot 58, with a connection to the elements provided at the top of the frame 52. As liquid level varies, elements 60 will be drive upwardly or downwardly to affect coupling between T–I and R–I in the manner previously described and a circuit similar to that described with respect to FIG. 6 may be utilized to develop a control signal, which through suitable amplification may be measured by an instrument such as 62; or may be made to drive a valve or pump or the like to regulate liquid level as measured by the system of FIG. 12.

Having now disclosed the invention in terms intended to enable a preferred practice thereof, in various illustrative modes, claims are appended which are intended to define what is believed invention.

What is claimed is:

1. In a method of sensing the position of a member, the steps comprising, generating an RF signal, supplying said signal to one of a pair of sensing elements to provide a coupling field therebetween traversed by said member, detecting the degree of coupling between said sensing elements as affected by the position of said member therebetween, including the reception and detection of a signal based on said coupling through receiver elements, and supplying the detected signal to a utility device, wherein said utility device includes means to control movement of said member and the detected signal is utilized to alter the position of said member to a predetermined position between said sensing elements.

2. In a method of sensing the position of a member, the steps comprising: generating an RF signal; supplying said signal to one of a pair of sensing elements positioned with the length axes thereof disposed at an angle to provide a coupling field therebetween which increases along the length of said elements and which is traversed by said member; detecting the degree of coupling between said sensing elements as affected by the position of said member therebetween, including receiving a signal bases on said coupling through the other of said sensing elements and detecting said signal with detecting means, the detected signal thereby having a linear characteristic; and supplying the detected signal to a utility device.

3. In a method of sensing the position of a member, the steps comprising: generating an RF signal, supplying said signal to one of a pair of sensing elements to provide a coupling field therebetween traversed by said member; detecting the degree of coupling between said sensing elements, as affected by the position of said member therebetween, including receiving a signal based on said coupling through the other of said sensing elements and detecting said signal with detecting means; and supplying the detected signal to a utility device, wherein said utility device includes means to control movement of said member and the detected signal is utilized to alter the position of said member to a predetermined position between said sensing elements.

4. In an apparatus for sensing the presence or the position of a moving member, a sensing structure including a first sensing element and a second sensing element positioned to provide a coupling therebetween affected by movement of the member along a predetermined path, which coupling varies along the length of said sensing elements, an RF transmitter connected to the first sensing element of said sensing structure to generate a signal providing said coupling, and a receiver connected to the said second sensing element including means responsive to the variation in coupling for providing a detected signal as an indication of the moving member.

5. In an apparatus for sensing the position of a moving member, a sensing structure including a first sensing element and a second sensing element positioned to provide a coupling therebetween affected by a path of movement of member, an RF transmitter connected to the first sensing element of said sensing structure to generate a signal providing said coupling, a receiver connected to the said second sensing element operable to provide a detected signal representative of the position of a member within the coupling between said sensing elements, and means positioning said sensing elements with the length axes thereof disposed at an angle to provide a coupling which increases along the length of the sensing elements to provide a linear characteristic to said detected signal as a member moves between said sensing elements.

6. In an apparatus for sensing a moving member, a sensing structure including a first sensing element and a second sensing element positioned to provide a coupling therebetween affected by movement of the member along a path, an RF transmitter connected to the first sensing element of said sensing structure to generate a signal providing said coupling, means for positioning said sensing elements with the length axes thereof substantially parallel to provide a coupling which is caused to vary in a predetermined manner by movement of a member into, through, and out of said coupling, and receiver means connected to the said second sensing element including means responsive to said variation in coupling for providing a detected pulse waveform characteristic as an indication of the moving member.

7 In an apparatus for sensing the position of a moving member, a sensing structure including a first sensing element and a second sensing element positioned to provide a coupling therebetween affected by a path of movement of the member, an RF transmitter connected to the first sensing element of said sensing structure to generate a signal providing said coupling, a receiver connected to the second sensing element operable to provide a detected signal representative of the position of a member within the coupling between said sensing elements, and means responsive to the detected signal from said receiver for utilizing the detected signal, said utilizing means including a motor connected to drive said member responsive to said signal to a predetermined position between said sensing elements.

8. In an apparatus for sensing the position of a moving member, a sensing structure including a first sensing element and a second sensing element positioned to provide a coupling therebetween affected by a path of movement of the member, an RF transmitter connected to the first sensing element of said sensing structure to generate a signal providing said coupling, a receiver connected to the said second sensing element operable to provide a detected signal representative of the position of a member within the coupling between said sensing elements, means responsive to the detected signal from said receiver for utilizing the detected signal, and means to confine them member to movement in a plane of coupling between said sensing elements.

9. In an apparatus for sensing the position of a moving member, a sensing structure including a first sensing element and a second sensing element positioned to provide a coupling therebetween affected by a path of movement of the member, an RF transmitter connected to the first sensing element of said sensing structure to generate a signal providing said coupling, a receiver connected to the said second sensing element operable to provide a detected signal representative of the position of a member within the coupling between said sensing elements, a conductive member connected to said moving member, and means to confine said conductive member for sliding movement within the coupling between said sensing elements.

10. In a method of sensing the position of a member, the steps comprising: generating an RF signal; supplying said RF signal to one of a pair of spaced-apart sensing elements to provide a coupling field therebetween, said coupling field varying along the length of said sensing elements in accordance with the position of said member therebetween; detecting the degree of coupling between said sensing elements as affected by the position of said member therebetween, including receiving a signal based on said coupling through the other one of said sensing elements and detecting said signal with detecting means, the detected signal thereby providing an indication of presence or position of the member; and supplying the detected signal to a utility device.

* * * * *